US006948310B2

(12) United States Patent
Roberts, Jr. et al.

(10) Patent No.: US 6,948,310 B2
(45) Date of Patent: Sep. 27, 2005

(54) USE OF A VARIABLE VALVE ACTUATION SYSTEM TO CONTROL THE EXHAUST GAS TEMPERATURE AND SPACE VELOCITY OF AFTERTREATMENT SYSTEM FEEDGAS

(76) Inventors: Charles E. Roberts, Jr., 8511 Timber West, San Antonio, TX (US) 78250; Andrew C. Matheaus, 4212 Medical Dr., #423, San Antonio, TX (US) 78229; David P. Branyon, 9723 Brown Run, San Antonio, TX (US) 78254; Rudolf H Stanglmaier, 2658 Concan St., San Antonio, TX (US) 78251; Lee G. Dodge, 7315 Whithers La., San Antonio, TX (US) 78240; Thomas W. Ryan, III, 13742 Wood Point Dr., San Antonio, TX (US) 78231; Daniel W. Stewart, 10309 Raffers Trail, Helotes, TX (US) 78023

( * ) Notice: Subject to any disclaimer, the term of this patent is extended or adjusted under 35 U.S.C. 154(b) by 0 days.

(21) Appl. No.: 10/261,128

(22) Filed: Oct. 1, 2002

(65) Prior Publication Data

US 2004/0060284 A1 Apr. 1, 2004

(51) Int. Cl.[7] ................................................. F01N 3/00
(52) U.S. Cl. .............................. 60/285; 60/274; 60/300
(58) Field of Search ........................... 60/274, 285, 299, 60/284, 300; 123/90.15, 90.16

(56) References Cited

U.S. PATENT DOCUMENTS

| | | | |
|---|---|---|---|
| 5,398,502 A | * | 3/1995 | Watanabe ..................... 60/284 |
| 5,414,994 A | * | 5/1995 | Cullen et al. ................. 60/274 |
| 5,531,193 A | | 7/1996 | Nakamura |
| 5,842,341 A | * | 12/1998 | Kibe ........................... 60/274 |
| 5,850,811 A | | 12/1998 | Tomisawa et al. |
| 5,934,263 A | | 8/1999 | Russ et al. |
| 6,029,626 A | | 2/2000 | Bruestle |
| 6,253,545 B1 | * | 7/2001 | Suzuki ........................ 60/278 |
| 6,513,319 B2 | * | 2/2003 | Nozawa et al. ............... 60/284 |
| 6,553,959 B2 | * | 4/2003 | Xu et al. ..................... 123/295 |
| 2003/0221421 A1 | * | 12/2003 | Gui et al. ..................... 60/295 |

FOREIGN PATENT DOCUMENTS

JP        2002-242711      *   8/2002

* cited by examiner

*Primary Examiner*—Thomas Denion
*Assistant Examiner*—Diem Tran

(57) ABSTRACT

A method for controlling the temperature and/or space velocity of exhaust gas passing through an aftertreatment device disposed in the exhaust system of a diesel engine provides an optimal environment for efficient conversion of NOx and undesirable emissions during transient and steady state engine operation. The method includes controlling intake and/or exhaust valve timing, either singly or in combination with fuel injection timing and selective individual cylinder cutout, in response to sensed engine operating parameters.

3 Claims, 5 Drawing Sheets

EXHAUST GAS TEMPERATURES ( °C )

LNT Efficiency as a Function of Gas Inlet Temperature

Tailpipe-Out NO$_x$ Conversion Values for
High Speed Turbocharged Diesel Equipped with LNT (%)

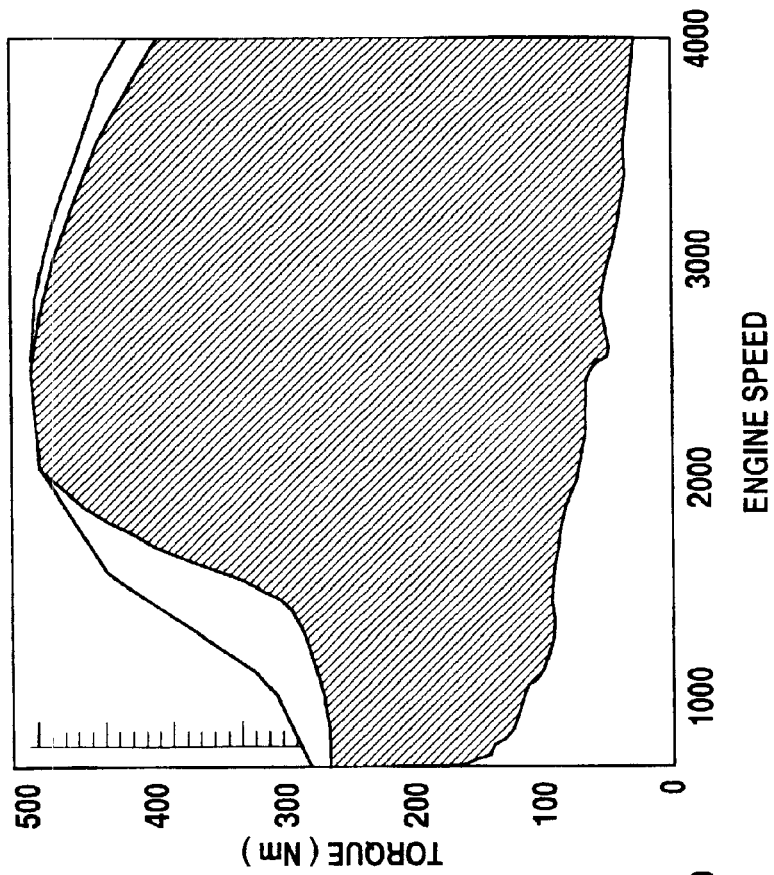
Fig. 6 — Area of 90% NOx Conversion with VVA Control
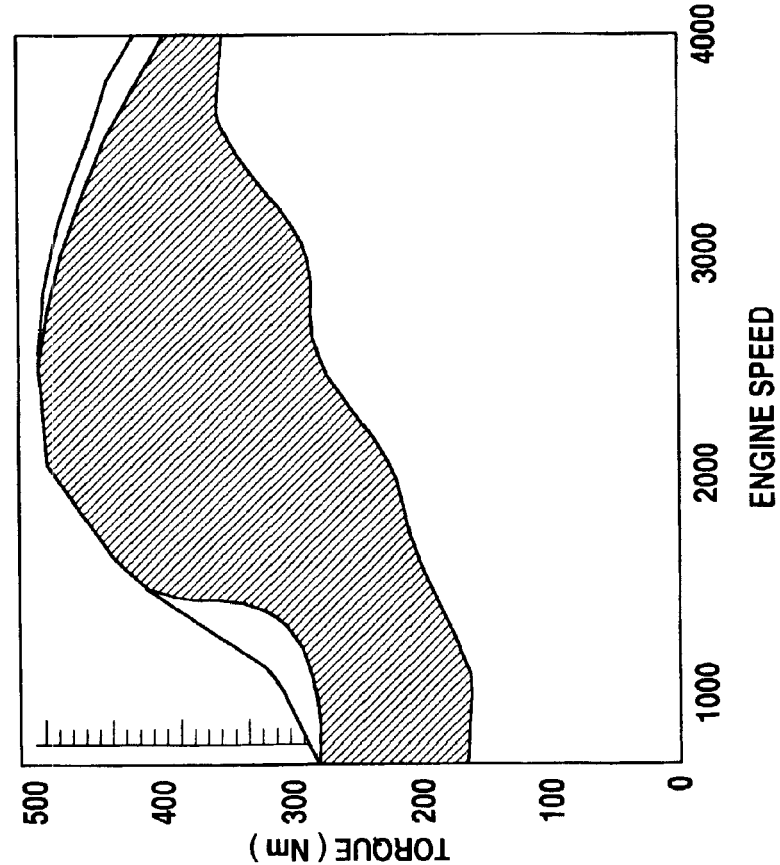
Fig. 5 — Area of 90% NOx Conversion without VVA Control

USE OF A VARIABLE VALVE ACTUATION SYSTEM TO CONTROL THE EXHAUST GAS TEMPERATURE AND SPACE VELOCITY OF AFTERTREATMENT SYSTEM FEEDGAS

BACKGROUND OF THE INVENTION

1. Technical Field

This invention relates generally to a method for using a variable valve actuation system to control the temperature and space velocity of exhaust gases delivered to an aftertreatment system in a diesel engine, and more particularly to a method for using a variable valve actuation system to optimize the conversion efficiency of exhaust gas aftertreatment devices over substantially all of a diesel engine operating range.

2. Background Art

Worldwide emissions regulations slated for introduction during the next five to ten years will require that diesel engines be equipped with some form of exhaust aftertreatment device, forcing the diesel industry into utilizing catalyst and emissions "trap" technologies not widely used heretofore for diesel engines. For optimum efficiency, these technologies, e.g., lean-NOx catalysts, lean NOx traps, and particulate traps, require operating temperatures outside of the temperature range available for a significant portion of a diesel engine operating range.

Several approaches have been proposed to control exhaust gas temperature in spark-ignition engines. For example, U.S. Pat. No. 6,029,626 granted Feb. 29, 2000 to Claus Bruestle for ULEV CONCEPT FOR HIGH-PERFORMANCE ENGINES proposes using variable valve timing to reduce unburned hydrocarbon emissions. Unburned hydrocarbon emissions are a pollutant commonly associated with spark ignited engines. U.S. Pat. No. 5,398,502 granted Mar. 21, 1995 to Kenzo Watanabe for a SYSTEM FOR CONTROLLING A VALVE MECHANISM FOR AN INTERNAL COMBUSTION ENGINE is also directed to exhaust gas temperature regulation in spark ignition engines. More specifically, U.S. Pat. No. 5,398,502 proposes the use of variable valve timing to control exhaust temperature as a strategy to increase exhaust gas temperature for fast catalytic converter lightoff during engine cold-starts. This patent further proposes exhaust gas temperature control when it is deemed that catalyst damage may occur due to over-heating.

Perhaps of most concern to the diesel engine industry are the proposed reductions in NOx emissions, because they are the most difficult to mitigate from the exhaust stream of fuel-lean combustion. Variations in engine airflow at constant fueling rates, typical in diesel engines, create a substantial range of exhaust gas temperatures and mass flow rates. One of the most promising technologies for NOx reduction in diesel engines is the "Lean NOx Trap" (LNT). However, lean NOx traps, like other catalytic-based aftertreatment devices, are most effective when the temperature and mass flow rate of exhaust gases passing through the aftertreatment device are maintained within limited ranges.

The present invention is directed to overcoming the problems associated with exhaust gas temperature and mass airflow control in diesel engines. It is desirable to provide a method for controlling the temperature and/or mass flow rate of exhaust gases over the entire functional range of a diesel engine to assure the optimal effectiveness of an aftertreatment device during both transient and steady state operation.

SUMMARY OF THE INVENTION

In accordance with one aspect of the present invention, a method for controlling the exhaust gas temperature of a diesel engine having an exhaust gas aftertreatment device, includes determining a desirable temperature operating range for the aftertreatment device and detecting at least one engine operating parameter correlative of engine speed, engine load, or exhaust gas temperature. The timing of any one, or all, of the opening of the intake valve, the opening of the exhaust valve, and the timing of fuel injection into a combustion chamber of the diesel engine, is controlled in response to the sensed operating parameter. The method further includes maintaining the temperature of the engine exhaust gas at a value within the desirable temperature operating range of the aftertreatment device during operation of the diesel engine.

In accordance with another aspect of the present invention, a method for controlling the space velocity of exhaust gas passing through an exhaust gas treatment device of a diesel engine, includes determining a desirable space velocity for exhaust gases passing through the aftertreatment device and sensing at least one engine operating parameter correlative of the mass airflow rate of air passing through the engine. The method further includes maintaining the desirable mass airflow rate during operation of the engine by controllably deactivating at least one of the intake valve, the exhaust valve, or fuel injection, in response to the sensed engine operating parameter.

BRIEF DESCRIPTION OF THE DRAWINGS

A more complete understanding of the present invention, embodying a method for controlling the temperature and space velocity of exhaust gases delivered to the aftertreatment systems of diesel engines, may be had by reference to the following detailed description when taken in conjunction with the accompanying drawings, wherein:

FIG. 5 is a graphical representation illustrating the improved conversion efficiency of the representative lean NOx trap within a high load operating regime of the engine, when the aftertreatment device is positioned downstream from the exhaust valve of the engine at a distance whereat exhaust gases delivered to the aftertreatment device have a temperature sufficient to maintain the conversion efficiency of the aftertreatment device at a value of at least 90 percent over a significant portion of the diesel engine's operating regime; and FIG. 6 is a graphical representation of the 90 percent or better conversion efficiency provided over substantially all of a diesel engine's operating regime when an aftertreatment device is optimally placed and exhaust gas temperature is controlled in accordance with the present invention.

DETAILED DESCRIPTION OF THE INVENTION

Figure 1:
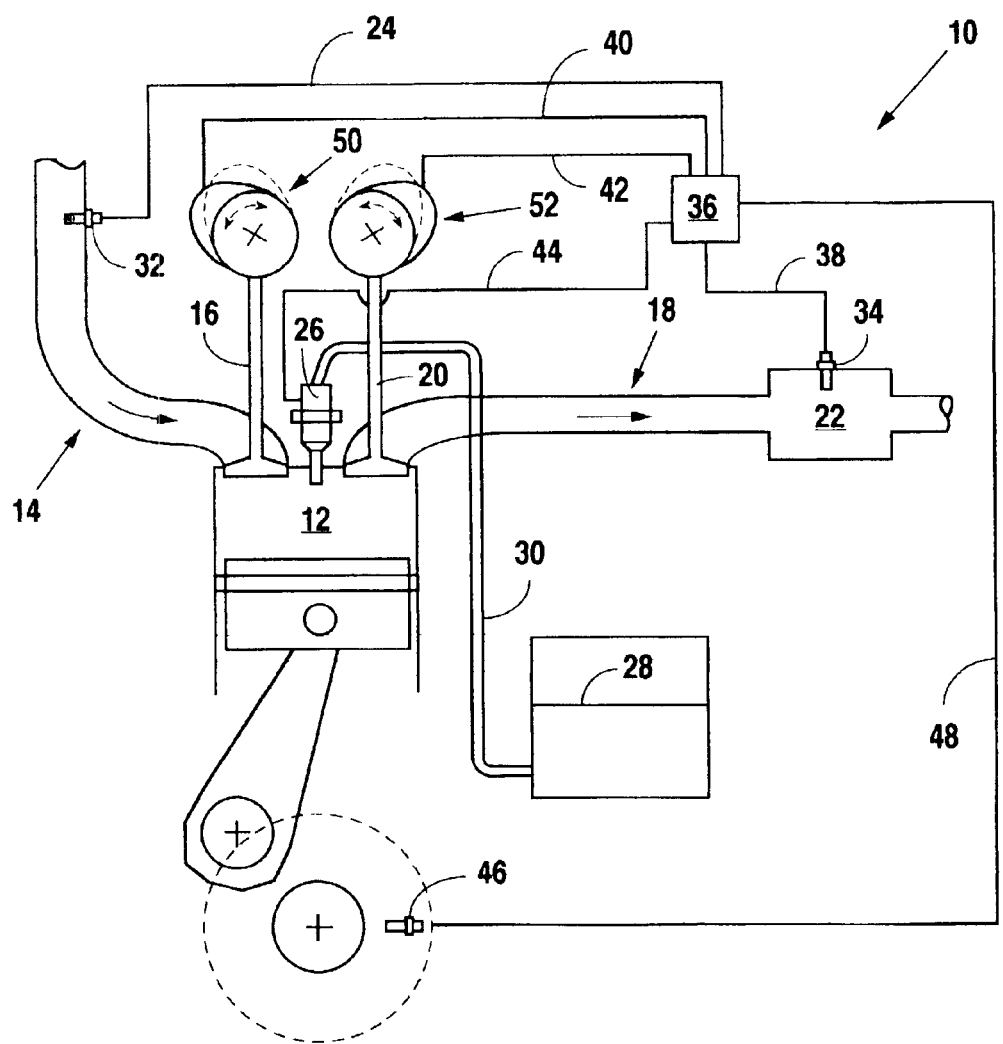
FIG. 1 is a schematic representation of a diesel engine adapted to carry out exhaust gas temperature and space velocity control in accordance with the method embodying the present invention.

A diesel engine 10, also known as a compression-ignition engine, suitable for use in carrying out exhaust gas temperature and space velocity control in accordance with the method embodying the present invention, is illustrated schematically in FIG. 1. The diesel engine 10 has a combustion chamber 12, an intake air system 14 in controlled fluid communication with the combustion chamber 12 by way of an intake valve 16, and an exhaust gas system 18 in controlled fluid communication with the combustion chamber 12 by way of an exhaust valve 20. An exhaust gas aftertreatment device 22, for example a lean NOx trap (LNT), is disposed in the exhaust gas system 18 at a position downstream of the exhaust valve 20.

Operation of the intake valve 16 and the exhaust valve 20 is respectively individually varied by any one of several well known variable valve actuation (VVA) systems 50,52. Fuel is injected into the combustion chamber 12 by a fuel injector 26 in fluid communication with a source of diesel fuel 28 by way of a fuel conduit 30. A mass airflow sensor 32 is disposed in the intake air system 14 at a position upstream of the intake valve 16. In an illustrative embodiment of the method embodying the present invention, a temperature sensor 34 is disposed in the exhaust gas aftertreatment device 22 at a position suitable for sensing the temperature of the aftertreatment device 22.

An electronic engine control unit (ECU) 36 receives a signal 38 from the aftertreatment device temperature sensor 34 and, in certain embodiments of the present invention, a mass airflow signal 24 from the mass airflow sensor 32. A crankshaft position sensor 46 provides a signal 48 to the ECU 36 indicative of crankshaft position. The ECU 36, in accordance with a preferred embodiment of the present invention described below in greater detail, delivers a control signal 40 to the VVA system 50 to control operation of the intake valve 16, a control signal 42 to the VVA system 52 to control operation of the exhaust valve 20, and a control signal 44 to control operation of the fuel injector 26.

Figure 2:
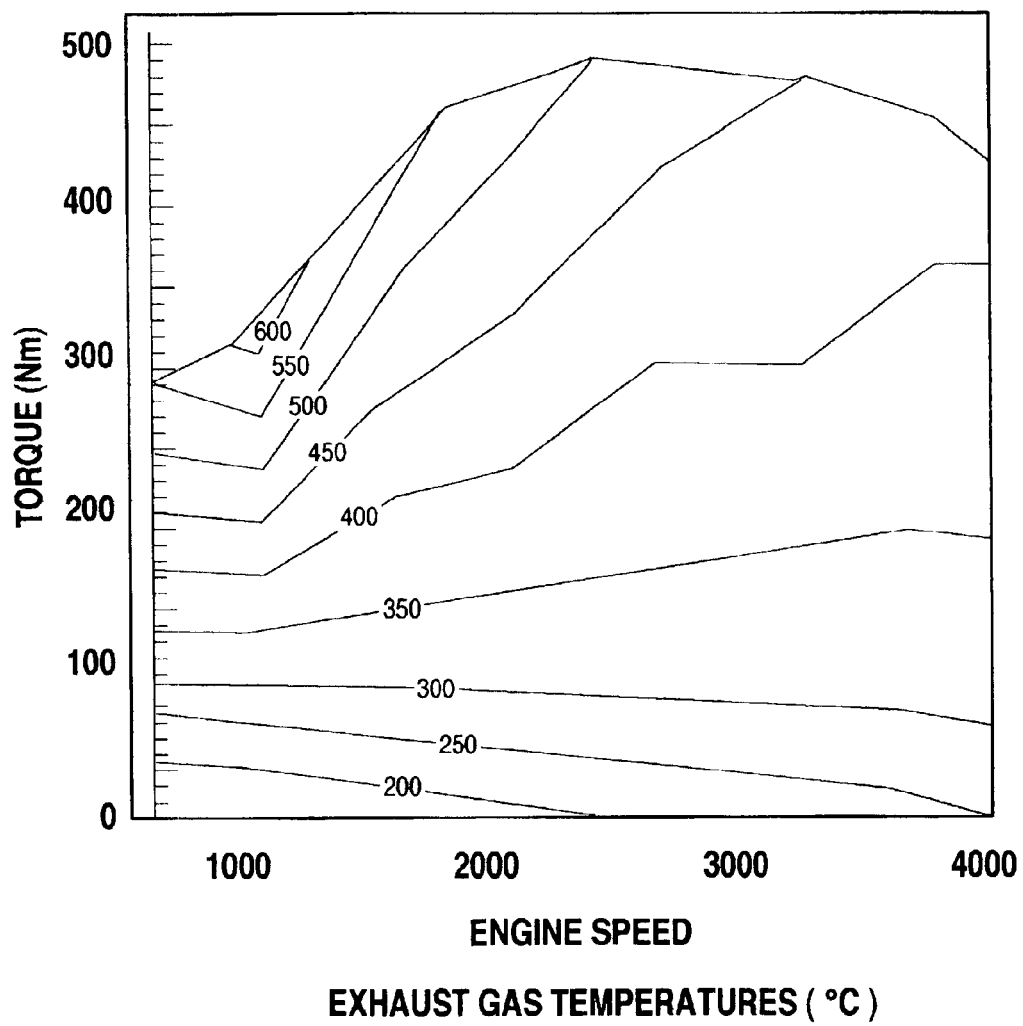
FIG. 2 is graphical representation of typical exhaust gas temperatures for a modern, high speed, turbocharged light-duty diesel engine, shown as a function of engine load (torque) and speed.

By way of illustration, exhaust gas temperatures produced by a representative modern, high speed, turbocharged light-duty diesel engine, as a function of engine load (torque) and speed, is graphically presented in FIG. 2. Note that over the operating range of the engine, exhaust gas temperatures vary from less than 200° C. to just over 600° C., and range of more than 400° C.

Figure 3:
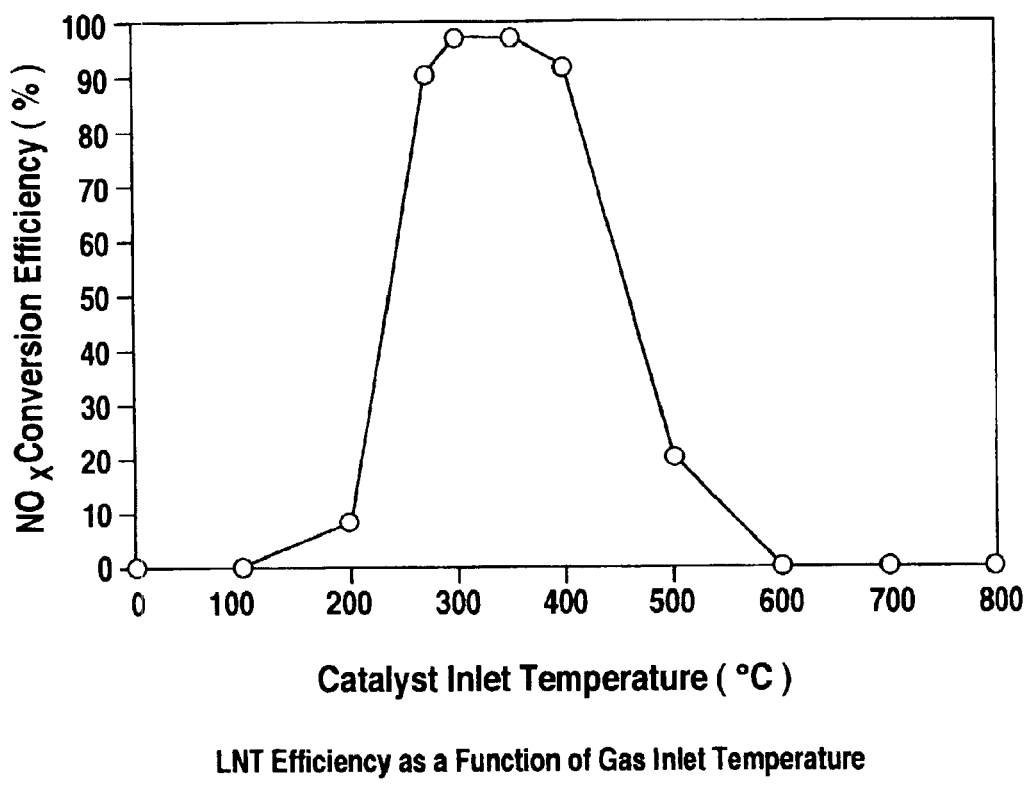
FIG. 3 is a graphical representation of the conversion efficiency of a representative lean NOx trap as a function of catalyst gas inlet temperature.

Various aftertreatment devices have specific temperature requirements for best emissions reduction efficiency. FIG. 3 shows the efficiency of a lean NOx trap (LNT) as a function of temperature as presented in EPA Heavy Duty Standards/Diesel Fuel, Draft RIA, of May 2000. The graph indicates that peak conversion efficiency occurs over a very limited temperate range, i.e., from about 300° C. to about 350° C. Therefore, it can be readily understood that it would be highly desirable to control exhaust gas temperature to maintain the temperature of the aftertreatment device within a range of no more than about 100° C.

Figure 4:
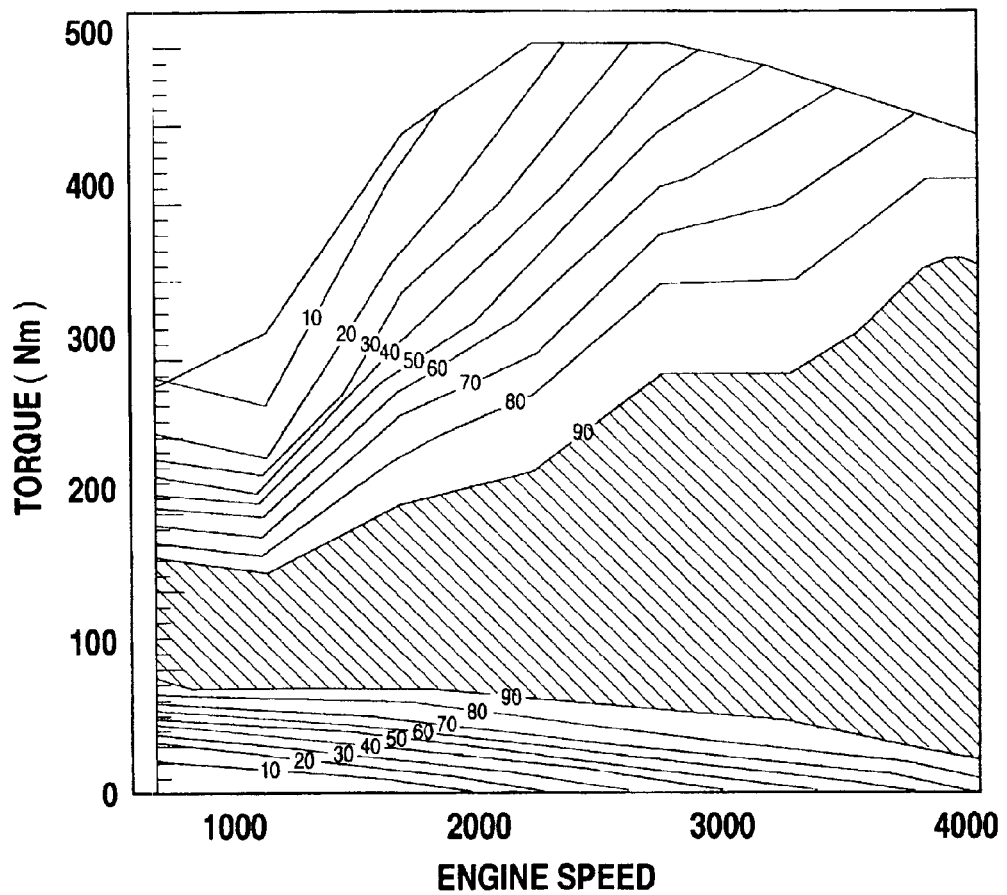
FIG. 4 is a graphical representation of typical tailpipe-out emissions reduction for a high speed turbocharged diesel engine when equipped with a lean NOx trap, as a function of engine load and speed.

By combining the exhaust gas temperature map of the light-duty high-speed diesel engine presented in FIG. 2, with the efficiency map or an LNT shown in FIG. 3, an overall NOx reduction efficiency can be determined for the entire operating range of the engine equipped with the LNT, as graphically presented in FIG. 4. The area of the engine load and speed range in which the LNT is capable of reducing emissions 90% or greater is represented by the shaded area bounded by 90% efficiency lines. As illustrated in FIG. 4, LNT reduction efficiency is highest in the middle portions of the engine operating range, with reductions of 10% or less at high load and low load conditions.

A better match of LNT to engine can be achieved if the LNT is placed downstream from the exhaust valve of the engine at a distance at which exhaust gases have a temperature, upon delivery to the LNT, sufficient to maintain the conversion efficiency of the LNT at a value of at least 90 percent when the engine is operating within the high load operating regime. For example, in the illustrative embodiment described herein, the result of placing the LNT downstream of the engine, at a distance sufficient to allow a 100° C. reduction in exhaust gas temperatures, shifts the entire efficiency map to higher efficiencies at higher loads, as illustrated in FIG. 5. The shaded area represents the engine operating regime in which 90% or better LNT conversion efficiency is achieved. The area of the map below the shaded area represents the engine operating regime in which the conversion efficiency of the LNT is less than 90% due to low exhaust gas temperature, and the area above the shaded area of map represents the engine operating regime in which the conversion efficiency of the LNT is less than 90% due to high exhaust gas temperature. As illustrated in FIG. 5, by placing the LNT downstream of the engine at a distance sufficient to allow a 100° C. reduction in exhaust gas temperatures, the engine is matched with the LNT such that 90% NOx reduction is achieved within the high load operating regime at all engine speeds. The present invention is directed to altering the low- and mid-range operating regimes of the engine of the engine to force higher conversion efficiencies within those ranges.

In a preferred embodiment of the present invention, exhaust gas temperature control in the diesel engine 10, shown schematically in FIG. 1, is achieved by the use of variable valve actuation (VVA), either separately or in combination with variable combustion timing (VCT), and/or individual cylinder cutout. In the illustrated embodiment, the engine electronic control unit 36 receives a temperature signal 38 from the aftertreatment device temperature sensor 34, a crankshaft position signal 48 from the crankshaft position sensor 46 and, if desired as described below, a mass airflow signal 24 from the mass airflow sensor 32, In accordance with a preprogramed schedule, the ECU 36 respectively controls, through control signals 40,42 the opening, duration, and closing of the intake valve 16 and the exhaust valve 20.

Use of VVA to reduce engine airflow is desirable because the "throttling" effect is created by the intake or exhaust valve. Throttling losses across the intake and exhaust valves are always present and are often used to create bulk flow or turbulence necessary for improved combustion. Hence, control of airflow by VVA only minimally increases throttling losses, when compared to other methods of airflow control that require secondary or additional throttles. Importantly, the timing of the exhaust valve opening controls the temperature at which exhaust gas enters the exhaust system and is subsequently delivered to the exhaust gas aftertreatment device. During the expansion stroke of the engine, work is extracted from the in-cylinder gas by motion of the piston. The exhaust valve opening event allows energy previously available to the piston to be transported to the exhaust system in the form of thermal energy carried by the exhaust gas mass flow. Thus, by varying the opening timing of the intake valve 16 and the exhaust valve 20, the energy made available to the exhaust system can be varied. FIG. 6 is a graphical representation of the significantly greater domain over which 90% or better conversion efficiency is achieved by variable valve actuation, in accordance with the present invention, in addition to optimal downstream placement of the aftertreatment device, as shown in FIG. 5. As indicated in FIG. 5, the shaded area of the map represents the engine operating regime in which 90% or better LNT conversion efficiency is achieved. The area of the map below the shaded area represents the engine operating regime in which the conversion efficiency of the LNT is less that 90% due to low exhaust gas temperature, and the area above the shaded area of map represents the engine operating regime in which the conversion efficiency of the LNT is less than 90% due to high exhaust gas temperature. A side-by-side comparison of FIGS. 5 and 6, clearly shows that variable valve actuation, in accordance with the present invention can advantageously provide exhaust gas temperature control for aftertreatment device conversion efficiency of 90% or more over substantially all of a diesel engine operating range.

In a similar manner, the ECU 36 controls fuel injection timing and duration by the control signal 44 electrically connected with the fuel injector 26. Variation in fuel injection timing also provides in-cylinder control of the time of combustion during the engine cycle and may advantageously be used in combination with variable valve actuation to provide an optimal feedgas temperature for use by an emissions aftertreatment device in diesel engine applications.

In another embodiment of the present invention, variable valve actuation is combined with individual cylinder cutout to provide an extended range of temperature control and regulate the space velocity of exhaust gas passing through the aftertreatment device 22 by controlling the mass flow rate of air passing through the engine 10. Control of mass flow rate, as sensed by the mass airflow sensor 32 and delivered to the engine control unit 36 by signal 24, allows optimal space velocities to be produced for efficient operation of emissions aftertreatment devices. Heretofore, most applications of individual cylinder cutout have been implemented on throttled, spark ignition engines. On throttled spark ignition engines, most of the advantages realized through cylinder cutout are due to the ability of such engines to run unthrottled when sufficient cylinders are disabled and the remaining cylinders ran at higher specific loads to maintain overall engine power.

Cylinder cutout for diesel engines can be accomplished by several methods. Simple deactivation of fuel delivery to some cylinders effectively deactivates power production from the selected cylinders. However, with no valve deactivation, the unfueled cylinders will act as air pumps through which work is consumed. Additionally, the unfueled cylinders will cool quickly as fresh air passes through the cylinder, thus creating difficulties in subsequent re-firing. In accordance with the present invention, valve deactivation is used to limit or eliminate airflow through the cylinders that are unfueled. Various valve deactivation choices can be made, including intake valve deactivation, exhaust valve deactivation, or both.

In carrying out the present invention, alternative means for determining the temperature environment of the aftertreatment device 22 and mass airflow through the engine 10, other than the above specifically described sensors and sensor locations, may be readily adapted for carrying out the present invention. For example, temperature sensors may be positioned in the exhaust system 18 upstream and/or downstream of the aftertreatment device 22, whereby the operating temperature of the aftertreatment device is extrapolated. It is also feasible to establish a map of predicted exhaust gas temperatures as a function of engine load, engine speed and ambient temperature for a specific engine, and use measurements of engine load, speed and ambient temperature as input signals to the electronic control unit 36 to control the temperature of the exhaust gas aftertreatment device 22 positioned in the exhaust system 18 of the engine 10. Also, other indicators of mass flow rate, as well as a predefined map of mass airflow as a function of engine load and speed, may be used to regulate the space velocity of exhaust gas passing through the exhaust gas aftertreatment device 22 disposed in the exhaust system 18 of the engine 10.

Although the present invention is described in terms of preferred illustrative embodiments, those skilled in the art will recognize that the above-described temperature and mass airflow parameters are illustrative of a representative diesel engine 10 and aftertreatment device 22. Actual parameter values are dependent upon the operating characteristics of a specific engine and aftertreatment device. Also, for equivalent power output in any engine, it should be realized that there are multiple combinations of cylinder cutout, individual cylinder injection timings, and intake and exhaust valve timings that may be implemented to provide optimum exhaust gas temperatures and space velocities to emissions aftertreatment devices. Moreover, the optimal cylinder cutout scheme for different engines will vary depending upon the heat transfer characteristics of the cylinder, as well as ring-pack and cylinder design. Furthermore, the method embodying the present invention as applied to controlling the temperature and space velocity of gases passing through a lean NOx trap is equally applicable to other catalytic-based exhaust gas treatment devices. Such applications of the method embodying the present invention are intended to fall within the scope of the following claims. Other aspects, features, and advantages of the present invention may be obtained from a study of this disclosure and the drawings, along with the appended claims.

What is claimed is:

1. A method for controlling the exhaust gas temperature of a diesel engine having at least one combustion chamber and at least one exhaust gas aftertreatment device disposed in an exhaust system of the engine, at least one intake valve interposed between an air intake system of the engine and said combustion chamber, at least one exhaust valve interposed between said combustion chamber and said exhaust gas aftertreatment system, said method comprising:

determining a desirable temperature operating range of said exhaust gas aftertreatment device;

determining a desirable mass airflow rate for the treatment of exhaust gases passing through said exhaust gas aftertreatment device;

sensing the value of at least one engine operating parameter correlative of engine speed, engine load including mass airflow passing through said diesel engine, and exhaust gas temperature;

controlling the operation of at least one of said intake valve and said exhaust valve in response to the sensed value of said engine operating parameter;

maintaining said desirable mass airflow rate by controlling deactivating at least one of said intake valve, said exhaust valve, and said fuel injector, in response to the sensed value of said engine operating parameter; and maintaining the temperature of engine exhaust gas introduced into said exhaust gas aftertreatment device at a value within said desirable temperature operating range of said exhaust gas aftertreatment device during operation over substantially all of the operating range of said diesel engine.

2. The method, as set forth in claim 1, wherein said sensing the value of at least one engine parameter correlative of mass airflow passing through the engine includes sensing the mass flow rate of air passing through the air intake system of the engine.

3. The method, as set forth in claim 1, wherein said diesel engine has a predefined operating regime, and said method includes positioning the exhaust gas aftertreatment device downstream from the exhaust valve of the engine at a distance whereat exhaust gases discharged through said exhaust valve have a temperature upon delivery to the aftertreatment device sufficient to maintain the conversion efficiency of the aftertreatment device at a value of at least 90 percent when the engine is operating over substantially all of said predefined operating regime.

* * * * *

UNITED STATES PATENT AND TRADEMARK OFFICE
CERTIFICATE OF CORRECTION

PATENT NO. : 6,948,310 B2
DATED : September 27, 2005
INVENTOR(S) : Charles E. Roberts, Jr. et al.

It is certified that error appears in the above-identified patent and that said Letters Patent is hereby corrected as shown below:

<u>Title page,</u>
Item [76], Inventors, delete "Daniel W. Stewart, 10309 Raffers Trail, Helotes, TX (US) 78023" insert -- Daniel W. Stewart, 10309 Rafter S Trail, Helotes, TX (US) 78023 --.

Signed and Sealed this

Twenty-ninth Day of November, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,948,310 B2 |
| APPLICATION NO. | : 10/261128 |
| DATED | : September 27, 2005 |
| INVENTOR(S) | : Charles E. Roberts, Jr. et al. |

It is certified that error appears in the above-identified patent and that said Letters Patent is hereby corrected as shown below:

On the Title Page, after Item (76) insert Item
(73)   Assignee:  Southwest Research Institute, San Antonio, TX (US)

Signed and Sealed this

Eighteenth Day of September, 2007

JON W. DUDAS
*Director of the United States Patent and Trademark Office*